No. 733,808. PATENTED JULY 14, 1903.
J. G. BRANDON.
NUT LOCK.
APPLICATION FILED SEPT. 10, 1902.
NO MODEL.

Witnesses
Inventor
James G. Brandon
By
Knight Bros
Attorneys

No. 733,808.                                    Patented July 14, 1903.

UNITED STATES PATENT OFFICE.

JAMES G. BRANDON, OF CHARLESTON, ILLINOIS.

NUT-LOCK.

SPECIFICATION forming part of Letters Patent No. 733,808, dated July 14, 1903

Application filed September 10, 1902. Serial No. 122,872. (No model.)

*To all whom it may concern:*

Be it known that I, JAMES G. BRANDON, a citizen of the United States, and a resident of Charleston, in the county of Coles and State of Illinois, have invented certain new and useful Improvements in Nut-Locks, of which the following is a specification.

This invention relates to nut-locks; and it has for its object to provide an inexpensive lock which may be quickly applied and removed from a nut and when applied will securely lock the nut against movement.

With these and other objects, as will be hereinafter disclosed, the invention consists of the parts and the combinations of parts described in the following specification and pointed out in the claims.

Figure 1:
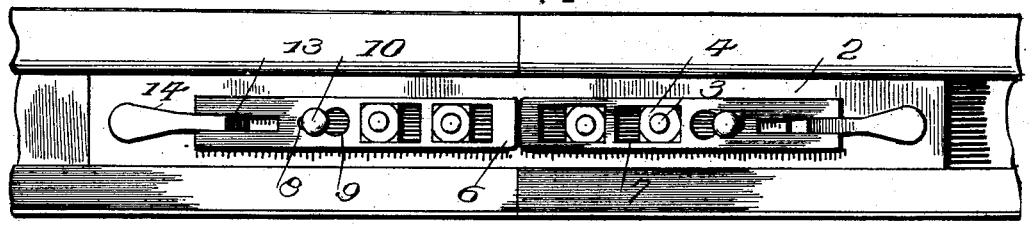
Figure 2:
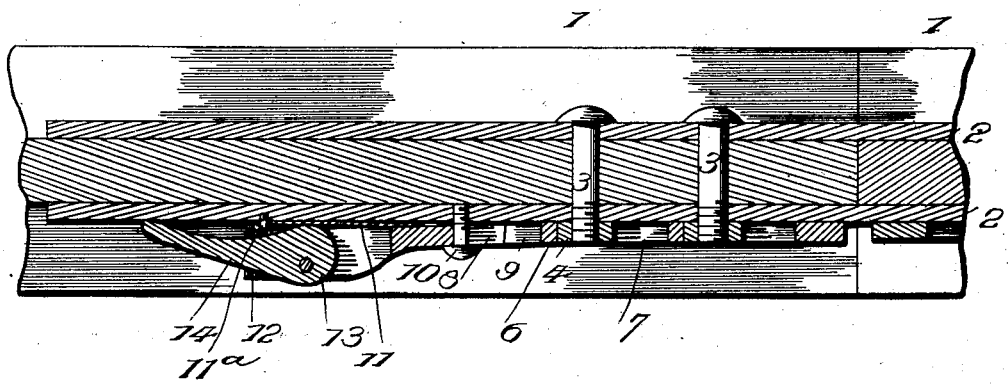
Figure 3:
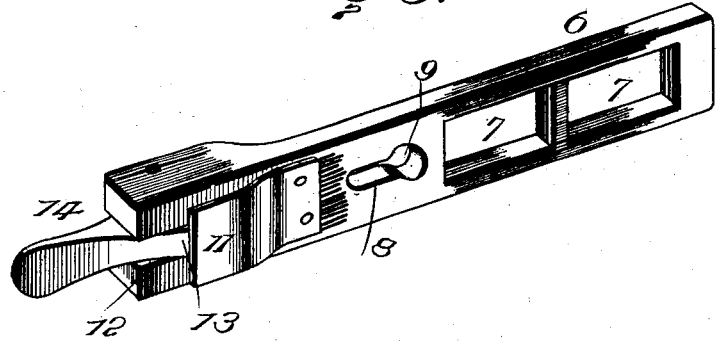

In the drawings forming a part of this specification, Figure 1 is a side view of a railroad-rail joint having my invention applied thereto. Fig. 2 is a horizontal section of the view shown in Fig. 1, and Fig. 3 is a perspective view of the lock detached from the rail.

While my invention may be used for locking nuts wherever employed, I have shown it in the attached drawings applied to a railroad-rail joint.

The two adjacent ends of the rail-sections 1 are connected together, as usual, by fish-plates 2, bolts 3, passing through openings in the rail-sections 1 and fish-plates 2, and nuts 4. A plate 6 is provided, adapted to engage with the nuts 4 to prevent their turning. This is accomplished by providing the plate 6 with one or more nut-receiving openings 7, which are elongated to permit the plate to be moved laterally. To hold the plate 6 to the object on which the nut or nuts are secured, the said plate is provided with a slot 8, having an enlarged portion 9. A headed stud 10, secured to the fish-plate 2, is fitted into the enlargement 9, and the plate 6 is then given a slight movement, so that the stud enters into the smaller portion of the slot 8, and the nut-lock is held to the nuts. A small play is allowed between the plate 6 and fish-plate to permit the lock to be easily removed, said play being taken up by a flat spring 11, secured at one end upon the inner side of the plate, extending longitudinally of the same and adapted to ride over a lug 11ª on the fish-plate 2 to hold the plate 6 against longitudinal movement. To lock the plate against movement, one end of the plate 6 is bifurcated, as shown at 12, and between the bifurcation is mounted a cam 13, having an operating-finger 14 and bearing against the spring 11.

The operation of the invention is as follows: The plate 6 is fitted to the rail so that the nuts 4 enter the elongated openings 7 and the headed stud 10 enters the enlarged portion 9 of the slot 8. The nut-lock is then given a slight movement, so that the stud 10 enters the reduced portion of the slot 8 and the spring 11 drops behind the lug 11ª on the fish-plate. The cam 13 is then turned by the finger 14, and the lock will be securely held in place. To remove the lock, the operation is reversed.

Various changes in form, proportion, and minor details may be made within the scope of the appended claims without departing from the spirit of my invention.

Having thus described my invention, what I claim is—

1. The combination with a plate having an elongated nut-receiving opening to permit the plate to slide while surrounding the nut, of the object upon which the nut is secured, one of said parts having a slot with an enlarged portion and the other of said parts having a fixed headed stud to fit within said slot, and a cam locking the plate against movement.

2. In a nut-lock, the combination with a plate having nut-receiving openings and a bifurcated end, of means holding the plate on the nut, and a cam mounted in the bifurcation and adapted to be turned to bear against the object secured by the nut to lock the plate against movement.

3. In a nut-lock, the combination with a plate having elongated nut-receiving openings to permit the plate to slide while surrounding the nut, and a slot having an enlarged portion, of a rigid headed stud carried by the object carrying the nut to fit within said slot, and a spring for taking up the play between the plate and the object carrying the nut.

4. The combination with the plate, provided with an elongated nut-receiving opening, a slot having an enlarged portion, and a bifurcated end; of a headed stud secured to the object carrying the nut; a spring for taking up the play between the plate and the object carrying the nut; and a cam between the bifurcation of the plate, adapted to lock the plate to the object carrying the nut.

5. The combination with a slidable plate having means for holding a nut against movement, of a flat spring interposed between the plate and the object carrying the nut and a lug behind which the spring engages when the plate is slid to a certain position to lock the plate against movement.

6. The combination with a slidable plate having elongated nut-receiving openings, a flat spring upon the inner side of the plate, and a lug behind which the spring engages when the plate is slid to a certain position.

The foregoing specification signed this 25th day of August, 1902.

JAMES G. BRANDON.

In presence of—
  LON FOLK,
  CHAS. H. GRIFFITH.